United States Patent [19]

Nishikawa et al.

[11] Patent Number: 5,119,496
[45] Date of Patent: Jun. 2, 1992

[54] METHOD AND APPARATUS FOR INTERRUPT PROCESSING IN A COMPUTER SYSTEM HAVING PERIPHERAL UNITS CONNECTED IN A DAISY CHAIN

[75] Inventors: Sinji Nishikawa, Kawasaki; Hiroyuki Fujiyama, Hino; Kouichi Kuroiwa; Shinji Oyamada, both of Yokohama; Hidetoshi Shimura, Kawasaki, all of Japan

[73] Assignees: Fujitsu Limited; Fujitsu Microcomputer Systems Limited, both of Kanagawa, Japan

[21] Appl. No.: 282,778

[22] Filed: Dec. 12, 1988

[30] Foreign Application Priority Data

Dec. 18, 1987 [JP] Japan .................. 62-321905

[51] Int. Cl.⁵ .................. G06F 13/24; G06F 13/37
[52] U.S. Cl. .................. 395/725; 364/241.1; 364/241.2; 364/940.3
[58] Field of Search ... 364/200 MS File, 900 MS File; 340/825.05, 815.02; 370/85.5; 371/11.2

[56] References Cited

U.S. PATENT DOCUMENTS

| | | |
|---|---|---|
| 3,766,530 | 10/1973 | Ito . |
| 4,209,838 | 6/1980 | Alcom, Jr. et al. .............. 364/200 |
| 4,225,942 | 9/1980 | Kobs et al. .............. 364/900 |
| 4,380,052 | 4/1983 | Shima .............. 364/900 |
| 4,617,566 | 10/1986 | Diamond .............. 340/825.05 X |
| 4,641,266 | 2/1987 | Walsh .............. 364/200 |
| 4,852,043 | 7/1989 | Guest .............. 364/900 |

FOREIGN PATENT DOCUMENTS 0030978 7/1981 European Pat. Off. .

OTHER PUBLICATIONS

European Search Report
IBM Technical Disclosure Bulletin, vol. 22, No. 10, Mar. 1980.
WO-A-8-502-474, (American Telephone & Telegraph Co.).
IEEE Micro, vol. 5, No. 1, Feb. 1985, pp. 53-66.

Primary Examiner—Greth D. Shaw
Assistant Examiner—Paul Kulik
Attorney, Agent, or Firm—Armstrong, Nikaido, Marmelstein, Kubovcik & Murray

[57] ABSTRACT

An interrupt processing method and an interrupt processing apparatus provides an end indicative information storing unit for storing an end indicative information of a daisy chain for at least one of a plurality peripheral units, the peripheral unit receiving the indicative information when the peripheral unit receives an acknowledge signal but does not output a request signal, and the peripheral unit outputs a specific chain end state signal to the central processing unit, so that the central processing unit is returned from a response waiting state. Therefore, when an error request signal is produced by noise, etc., delay at a central processing unit is reduced. Further, the daisy chain connection is cut at an optional portion and a request signal from an irrelevant peripheral unit is ignored, so that the efficiency of the processing is improved.

23 Claims, 9 Drawing Sheets

METHOD AND APPARATUS FOR INTERRUPT PROCESSING IN A COMPUTER SYSTEM HAVING PERIPHERAL UNITS CONNECTED IN A DAISY CHAIN

BACKGROUND OF THE INVENTION

1. Field of the Invention

The present invention relates to a processing method and a processing apparatus for a computer system, more particularly, to an interrupt processing method and an interrupt processing apparatus for a computer system having a central processing unit and a plurality of peripheral units (peripheral equipment), wherein an interrupt request signal is transferred from each peripheral unit to the central processing unit, and an interrupt acknowledge signal in response to the interrupt request signal is successively propagated from the central processing unit to each peripheral unit by a daisy chain connection.

2. Description of the Related Art

In the prior art, an interrupt processing is carried out, for example. by using a daisy chain connection constructed by a plurality of peripheral units. An interrupt request signal is output from each peripheral unit to a central processing unit through a signal conductor, and when the central processing unit receives the interrupt request signal and an interrupt processing is enabled, the central processing unit outputs an interrupt acknowledge signal to the peripheral unit by using a daisy chain connection. Namely, the central processing unit first outputs the interrupt acknowledge signal to a first step peripheral unit, and if the first step peripheral unit does not output the interrupt request signal, the interrupt acknowledge signal is propagated to a secodn step peripheral unit, i.e., a next step peripheral unit. Therefore, as described above, the interrupt acknowledge signal is successively propagated to each peripheral unit. When the interrupt acknowledge signal is , propagated to the specific peripheral unit which has output the interrupt request signal, the specific peripheral unit outputs a vector address to the central processing unit through a data bus, so that an interrupt processing routine for the specific peripheral unit is started. Note, the above peripheral units may be not only input-output devices or auxiliary storages, but also interrupt controllers. The input-output device or auxiliary storage is, for example, a cathode ray tube display, an optical mark reader, and a hard disk drive device, etc. The interrupt controller, which is used as an interrupt handler or an interrupt generator, controls a plurality of input-output devices or auxiliary storages.

Note, if noise exists in the signal conductor in which the interrupt request signal is transferred, this noise may be taken as the interrupt request signal in the central processing unit. In this case, the central processing unit outputs an error interrupt acknowledge signal, without receiving a correct interrupt request signal. Therefore, none of the peripheral units outputs a response signal to the central processing unit, and thus the central processing unit is held in a response waiting state and the processing is unnecessarily delayed.

SUMMARY OF THE INVENTION

In consideration of the above-mentioned problems when an error interrupt request signal is propagated to a central processing unit, an object of the present invention is to reduce a delay in a return from a response waiting state of the central processing unit, to avoid an unnecessary of waste time.

According to the present invention, there is provided a processing method for a computer system having a central processing unit and a plurality of peripheral units, wherein a request signal is transferred from each peripheral unit to the central processing unit, and an acknowledge signal in response to the request signal is successively propagated from the central processing unit to each peripheral unit by a daisy chain connection, which comprises: a step for setting indicative information to an end indicative information storing means of at least one of the peripheral units; a step for outputting a specific signal notifying the central processing unit of a chain end state, from the peripheral unit at which the indicative information is set to the end indicative information storing means thereof, when the peripheral unit receives the acknowledge signal and does not output the request signal; and a step for returning the central processing unit from a response waiting state by receiving a specific signal.

According to the present invention, there is also provided a processing apparatus having a central processing unit and a plurality of peripheral units, wherein a request signal is transferred from each peripheral unit to the central processing unit, and an acknowledge signal in response to the request signal is successively propagated from the central processing unit to each peripheral unit by a daisy chain connection, wherein each peripheral unit comprises a request signal output means and input-output terminals, at least one of the peripheral units comprises an end indicative information storing means as a chain end state notification means, and the central processing unit comprises means for causing a return from the chain end state. The request signal output means is operatively connected to the central processing unit and outputs a request signal from each peripheral unit to the central processing unit, and the input-output terminals are operatively connected to the central processing unit or an adjacent peripheral unit to construct the daisy chain connection among the central processing unit and the peripheral units. The end indicative information storing means is operatively connected to the chain end state notification means and stores an end indicative information of the daisy chain, and the chain end state notification means is operatively connected to the central processing unit and notifies the central processing unit of a chain end state, when the peripheral unit has received the acknowledge signal but does not output the request signal, and the end indicative information is set to the end indicative information storing means thereof. The returning means is operatively connected to the chain end state notification means, and return the central processing unit from the response waiting state by receiving a specific signal from the abnormally state notification means.

BRIEF DESCRIPTION OF THE DRAWINGS

The present invention will be more clearly understood from the description of the preferred embodiments as set forth below with reference to the accompanying drawings, wherein:

FIG. 7, the composite of FIGS. 7A and 7B, is a block diagram of an interrupt processing apparatus using interrupt controllers;

DETAILED DESCRIPTION OF THE PREFERRED EMBODIMENTS

For a better understanding of the preferred embodiments, the problems of the prior art will be first explained.

Figure 1:
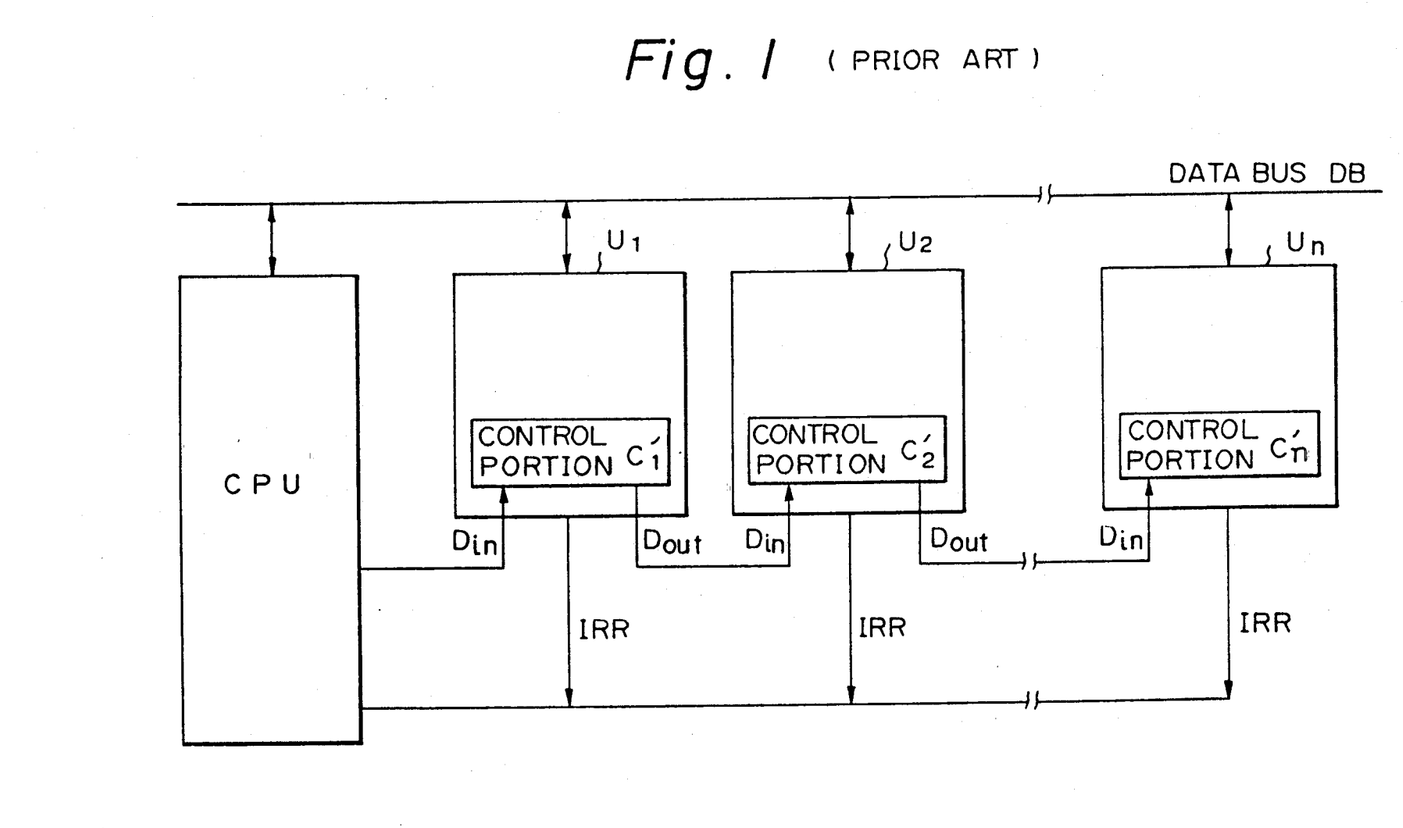
FIG. 1 is a block diagram illustrating an example of a conventional interrupt processing apparatus.

FIG. 1 is a block diagram illustrating an example of a conventional interrupt processing apparatus. In this drawing, reference CPU denotes a central processing unit, $U_1$-$U_n$ denote peripheral units, DB denotes a data bus, IRR denotes an interrupt request signal, $D_{in}$ denotes an interrupt acknowledge signal from the central processing unit or an immediately prior step, $D_{out}$ denotes an interrupt acknowledge signal to be output to a next step, and $C_1'$-$C_n'$ denote control portions.

In FIG. 1, an interrupt request signal IRR of each peripheral unit $U_1$-$U_n$ is output to a central processing unit CPU through a common signal conductor. For example, when the peripheral unit $U_n$ outputs an interrupt request signal IRR, the central processing unit CPU receives the interrupt request signal IRR and an interrupt processing is enabled, and the central processing unit CPU outputs an interrupt acknowledge signal $D_{in}$. A control portion $C_1'$ of the peripheral unit $U_1$ receives the interrupt acknowledge signal $D_{in}$ and outputs an interrupt acknowledge signal $D_{out}$ to the next peripheral unit $U_2$ as an interrupt acknowledge signal $D_{in}$ thereof, since the peripheral unit $U_1$ has not output an interrupt request signal. Thus, as described above, the interrupt acknowledge signal is successively propagated to each peripheral unit. When the interrupt acknowledge signal $D_{in}$ is propagated to the peripheral unit $U_n$ which has output an interrupt request signal IRR, a control portion $C_n'$ of the peripheral unit $U_n$ outputs a vector address to the central processing unit CPU through a data bus DB, and thus an interrupt processing routine for the peripheral unit $U_n$ is started.

In FIG. 1, when noise exists in a signal conductor in which the interrupt request signal IRR is propagated, the noise may be taken as the interrupt request signal IRR in the central processing unit CPU. In this case, the central processing unit CPU outputs an interrupt acknowledge signal $D_{in}$, but none of the peripheral units $U_1$-$U_n$ outputs a response signal to the central processing unit CPU. Therefore, an interrupt acknowledge signal $D_{in}$ is propagated to the final step peripheral unit $U_n$ although the central processing unit CPU has not received a vector address of an interrupt processing routine, and therefore, the central processing unit CPU is held in a response waiting state and a long and unnecessary delay occurs.

To solve the above described problem, a timer is provided, and when the response waiting state of the central processing unit CPU continues for longer than a specific time, the central processing unit CPU is returned to the normal state from the response waiting state. In this case, however, if the time elapsed is not sufficient, an obstacle is formed by a normal operating state, and therefore, the time elapsed is too long, and thus an unnecessary delay occurs.

In consideration of the above, the present invention reduces a time elapsed before a return from a response waiting state of a central processing unit without a long and unnecessary delay, when an error interrupt request signal is to be propagated to the central processing unit.

Below, an interrupt processing method and an interrupt processing apparatus of the present invention will be explained in detail with reference to the drawings.

Figure 2:
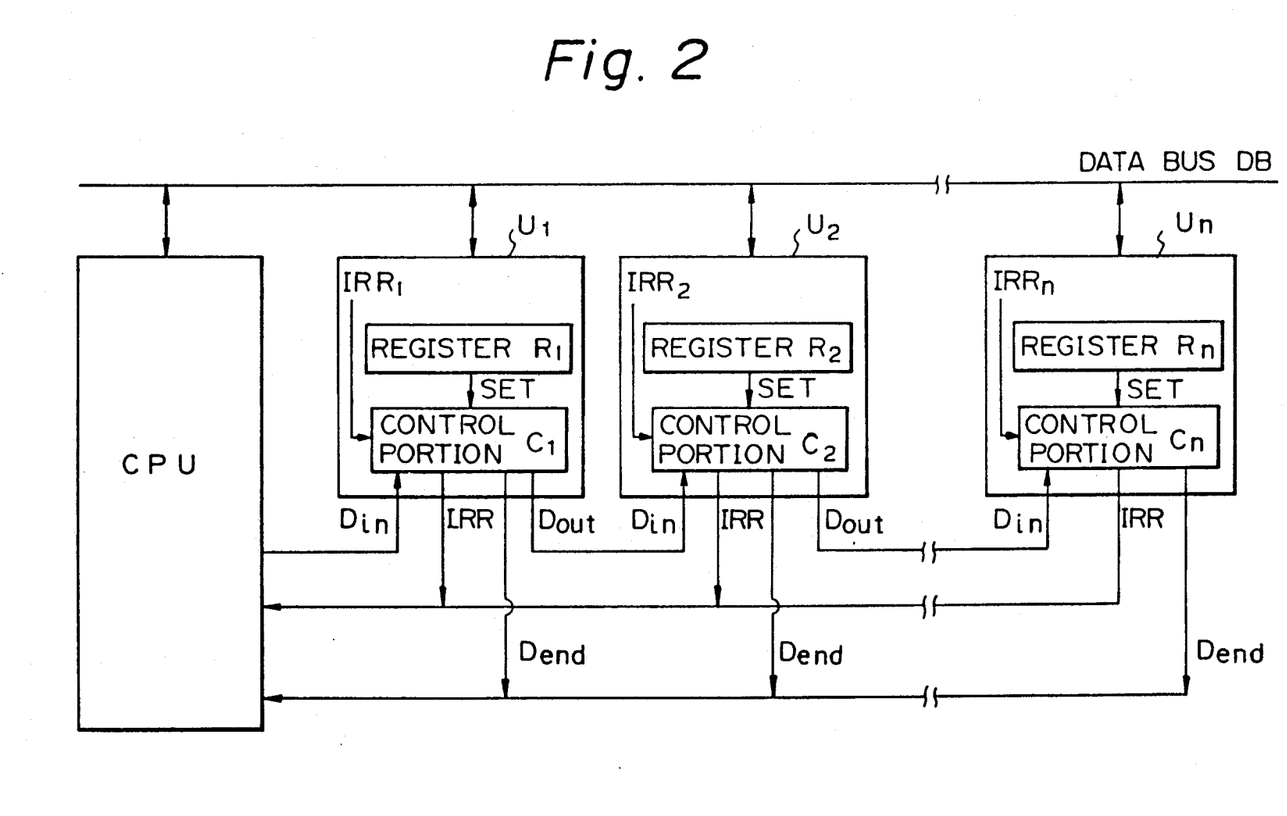
FIG. 2 is a block diagram illustrating an embodiment of an interrupt processing apparatus according to the present invention.

FIG. 2 is a block diagram illustrating an embodiment of an interrupt processing apparatus according to the present invention. In FIG. 2, reference $R_1$-$R_n$ denote registers, $C_1$-$C_n$ denote control portions, SET denotes end indicative information, $IRR_1$-$IRR_n$ denote an interrupt request signal generated from each peripheral unit $U_1$-$U_n$, and $D_{end}$ denotes an end notice signal. Note, the peripheral units $U_1$-$U_n$ are input-output devices or auxiliary storages, i.e., each peripheral unit $U_1$-$U_n$ is, for example, a cathode ray tube display, an optical mark reader, and a hard disk drive device, etc. Note, the same portions of FIGS. 1 and 2 are indicated by the same references. An interrupt processing using a daisy chain connection in a normal state, is the same as that of the prior art of FIG. 1, and thus only the case where an error interrupt request signal is generated by noise, etc., will be explained below.

Each register $R_1$-$R_n$ is a one-bit register and stores end indicative information corresponding to one kind of flag. The end indicative information is output from a central processing unit CPU to a selected one of the peripheral units through a data bus DB and is set to a register of the one of the peripheral units. For example, assuming that end indicative information is set in a register $R_n$ of a peripheral unit $U_n$, and none of the peripheral units $U_1$-$U_n$ generates an interrupt request signal $IRR_1$-$IRR_n$, in this state, when the central processing unit takes a noise signal as an interrupt request signal and starts an interrupt acceptance processing, i.e., the central processing unit CPU outputs an interrupt acknowledge signal $D_{in}$ to a control portion $C_1$ of a first step peripheral unit $U_1$, an interrupt request signal IRR is not output from the peripheral unit $U_1$ and end indicative information is not set in a register $R_1$ of the control portion $C_1$, so that an interrupt acknowledge signal $D_{out}$ is transferred to a control portion $C_2$ of a second step peripheral unit $U_2$ as an interrupt acknowledge signal $D_{in}$ thereof. Similarly, in the second step peripheral unit $U_2$, an interrupt request signal IRR is not output from the peripheral unit $U_2$ and end indicative information is not set to a register $R_2$ of the control portion $C_2$, so that an interrupt acknowledge signal $D_{out}$ is transferred to the next control portion of the next step peripheral unit through the control portion $C_2$.

As described above, an interrupt acknowledge signal $D_{out}$ is successively transferred to a control portion $C_n$ of the peripheral unit $U_n$ as an interrupt acknowledge signal $D_{in}$ thereof, in the same manner. In the peripheral unit $U_n$, if end indicative information is set to the register $R_n$ of the peripheral $U_n$ but an interrupt request $IRR_n$ is not received by the C.P.U., i.e., if end indicative information SET is output from the register $R_n$ to the control portion $C_n$ but an interrupt request IRR is not output to the central processing unit CPU, a one-bit end notice signal $D_{end}$ is output from the control portion $C_n$ to the central processing unit CPU through a signal conductor. The central processing unit CPU receives the end notice signal $D_{end}$ and confirms a chain end state, and then the central processing unit CPU is returned from a response waiting state and carries out a predetermined error processing procedure, etc.

In the above embodiment, the end indicative information is set in the final step of the daisy chain connection, and when the end indicative information is set to the selected peripheral unit during the daisy chain connection, the end of the daisy chain connection can be determined by the CPU to be the selected peripheral unit. This is preferable since the interrupt requests output from low priority peripheral units connected after the selected peripheral unit to the daisy chain connection are disregarded, and a specific type of processing can be carried out on a temporary basis. In the above embodiment, registers $R_1$-$R_n$ are provided for all peripheral units $U_1$-$U_n$, but a register need be provided at only one of the peripheral units $U_1$-$U_n$; for example, only the register $R_n$ and the control portion $C_n$ as described above need be provided at the final peripheral unit.

Figure 3:
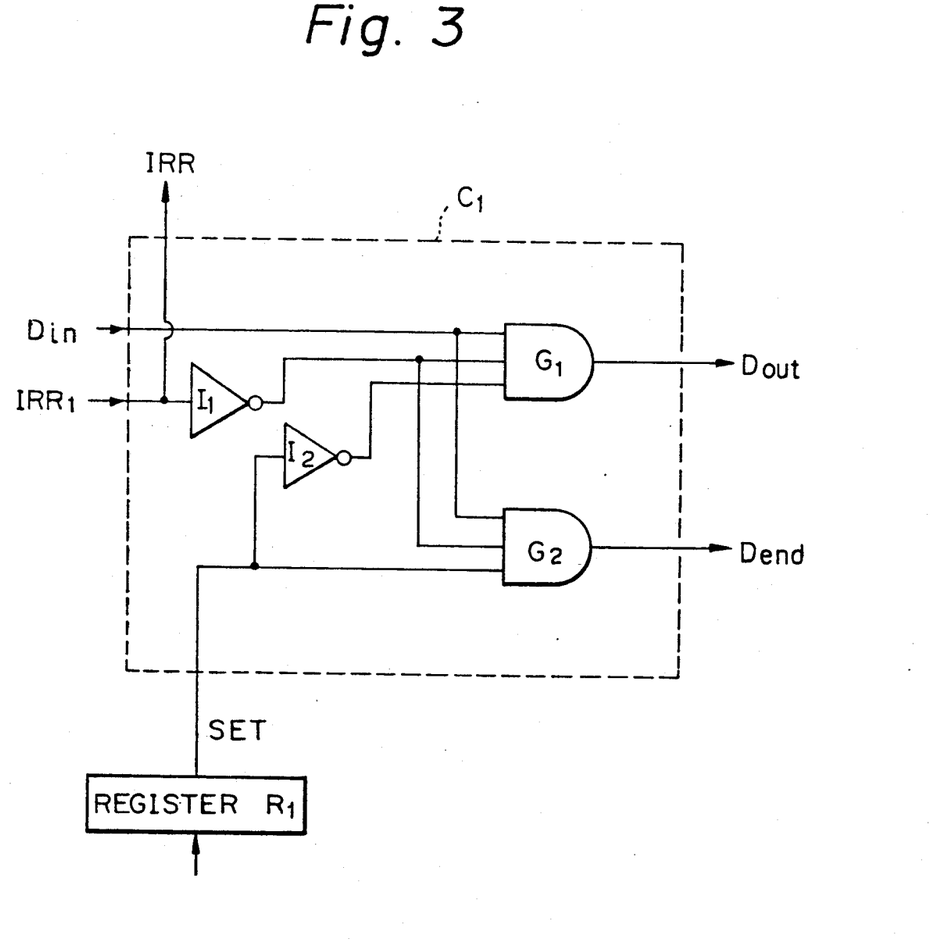
FIG. 3 is a circuit diagram of an example of a control portion shown in FIG. 2.

FIG. 3 is a circuit diagram of an example of a control portion shown in FIG. 2. As shown in FIG. 3, the control portion $C_1$ comprises two inverter circuits $I_1$, $I_2$ and two three-input AND gate circuits $G_1$, $G_2$. An input terminal of the inverter circuit $I_1$ is connected to an interrupt request output unit (not shown) included in each peripheral unit and receives an interrupt request signal $IRR_1$. Note, the interrupt request output unit is a signal output means or a signal output function in the peripheral unit, and a reference IRR substantially denotes the same signal as the interrupt request signal $IRR_1$. An input terminal of the inverter circuit $I_2$ is connected to the register $R_1$ and receives an end indicative signal SET from the register $R_1$.

A first input of the AND gate circuits $G_1$ is connected to the central processing unit CPU and receives an interrupt acknowledge signal $D_{in}$. When the AND gate circuit $G_1$ is provided for a post control portion of the first step peripheral unit $U_1$, the first input of the AND gate circuit $G_1$ is connected to a control portion of an immediately prior peripheral unit, for example, the AND gate circuit $G_1$ is provided for the control portion $C_2$ of the second step peripheral unit $U_2$ and the first input of the AND gate circuits $G_1$ is connected to an immediately prior control portion $C_1$. A second input of the AND gate circuits $G_1$ is connected to the first inverter circuit $I_1$ and receives an inverted signal of the interrupt request signal IRR, a third input thereof is connected to the second inverter circuit $I_2$ and receives an inverted signal of the end indicative signal SET, and an output thereof is connected to an immediately adjacent item of equipment, i.e., a second peripheral unit $U_2$, and outputs an interrupt acknowledge signal $D_{out}$ to the second peripheral unit $U_2$. When the AND gate circuit $G_1$ is provided for a control portion $C_n$ of the final step peripheral unit $U_n$, the output of the AND gate circuit $G_1$ is not connected.

A first input of the AND gate circuit $G_2$ is connected to the first input of the AND gate circuit $G_1$ and receives the interrupt acknowledge signal $D_{in}$. When the AND gate circuit $G_2$ is provided for a post control portion of the first peripheral unit $U_1$, the first input of the AND gate circuit $G_2$ is connected to a control portion of an immediately prior peripheral unit, as for the AND gate circuit $G_1$. A second input of the AND gate circuit $G_2$ is connected to the second input of the AND gate circuit $G_1$ and receives the inverted signal of the interrupt request signal IRR, a third input thereof is connected to the register $R_1$ and receives the end indicative signal SET, and an output thereof is connected to the central processing unit CPU and transfers an end notice signal $D_{end}$ to the central processing unit CPU through a signal conductor.

The operation of this circuit will be explained with reference to the timing charts of FIGS. 4, 5 and the following truth table.

TRUTH TABLE

|   | $D_{in}$ | IRR | SET | $D_{out}$ | $D_{end}$ |
|---|---|---|---|---|---|
|   | 0 | 0 | 0 | 0 | 0 |
|   | 0 | 0 | 1 | 0 | 0 |
|   | 0 | 1 | 0 | 0 | 0 |
|   | 0 | 1 | 1 | 0 | 0 |
| ① | 1 | 0 | 0 | 1 | 0 |
| ② | 1 | 0 | 1 | 0 | 1 |
| ③ | 1 | 1 | 0 | 0 | 0 |
| ④ | 1 | 1 | 1 | 0 | 0 |

Figure 4:
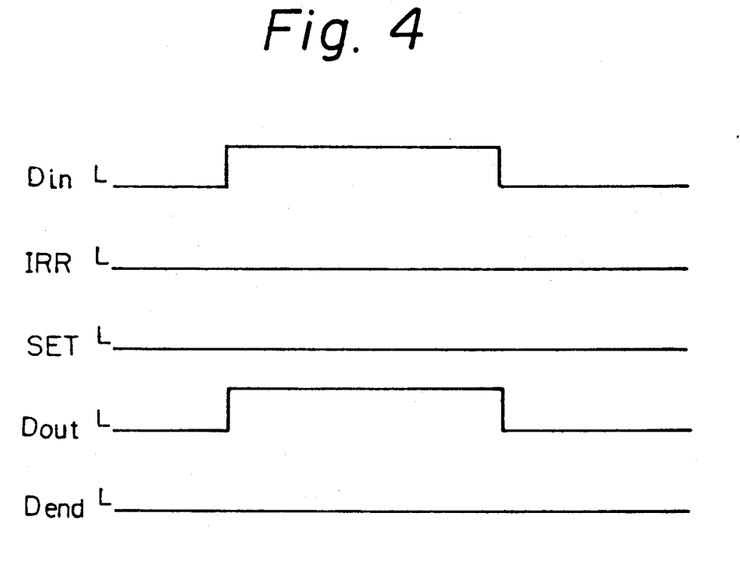
FIG. 4 is a timing chart of a register shown in FIG. 2 when not set.
Figure 5:
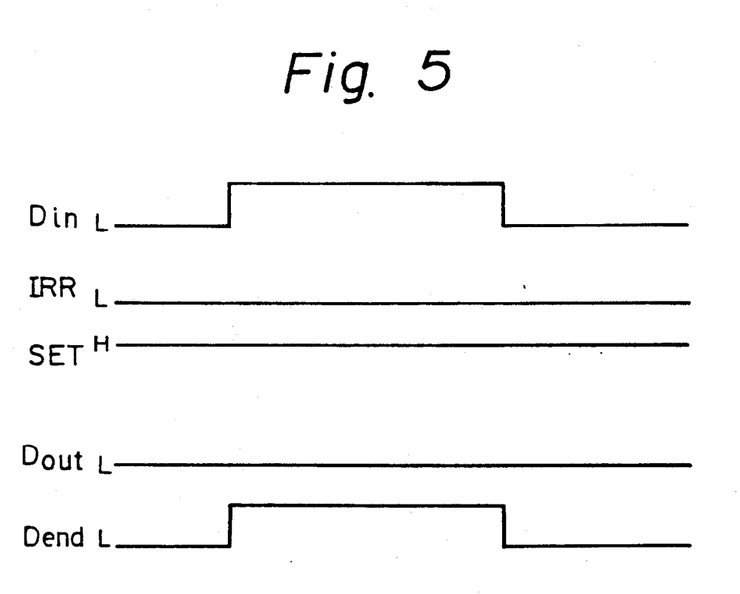
FIG. 5 is a timing chart of a register shown in FIG. 2 when set.

Note, in FIGS. 4 and 5, reference H corresponds to "1", and reference L corresponds to "0". In the above table, the line indicated by ① corresponds to a state of FIG. 4 (a timing chart when not setting and the register), a line indicating by ② corresponds to a state of FIG. 5 (a timing chart when not setting a register).

First, when the interrupt acknowledge signal $D_{in}$ is at "0", both an interrupt acknowledge signal $D_{out}$ which is an output of an AND-gate $G_1$ and an end notice signal $D_{end}$ which is an output of an AND-gate $G_2$ are "0", regardless of the state of an interrupt request signal IRR and an end indicative signal SET. The line 1 of the truth table indicates that the interrupt acknowledge signal $D_{in}$ is at "1" when the end indicative information signal SET is "0" and the interrupt request signal IRR is also "0". As shown in FIG. 4, the interrupt acknowledge signal $D_{in}$ is transferred to the next step as the interrupt acknowledge signal $D_{out}$, and the end notice signal $D_{end}$, which is an output signal of the AND-gate $G_2$, is maintained at "0". Therefore, the central processing unit CPU is held in a response waiting state.

The line ② of the truth table indicates that the interrupt acknowledge signal $D_{in}$ is "1" when the end indicative signal SET is "1", i.e., an end of the daisy chain is indicated, and the interrupt request signal IRR is "0". As shown in FIG. 5, the interrupt acknowledge signal $D_{out}$ is then "0", and the interrupt acknowledge signal $D_{in}$ is not transferred to the next step, and instead the end notice signal $D_{end}$ is then "1" and the central processing unit CPU is notified of a chain end state. As the result, the central processing unit CPU rapidly returns from the response waiting state, and carries out a specific error processing routine, etc.

As shown in the lines ③ and ④ of the truth table, when the interrupt request signal IRR is "1", i.e., when the interrupt request is output from the peripheral unit by itself, the interrupt acknowledge signal $D_{in}$ is not transferred to the next step, and the end notice signal $D_{end}$ is maintained at "0". Therefore, a vector address is output from the peripheral unit to the central processing unit CPU, so that an interrupt processing routine is carried out.

Next, another embodiment of an interrupt processing apparatus according to the present invention will be explained.

Figure 6:
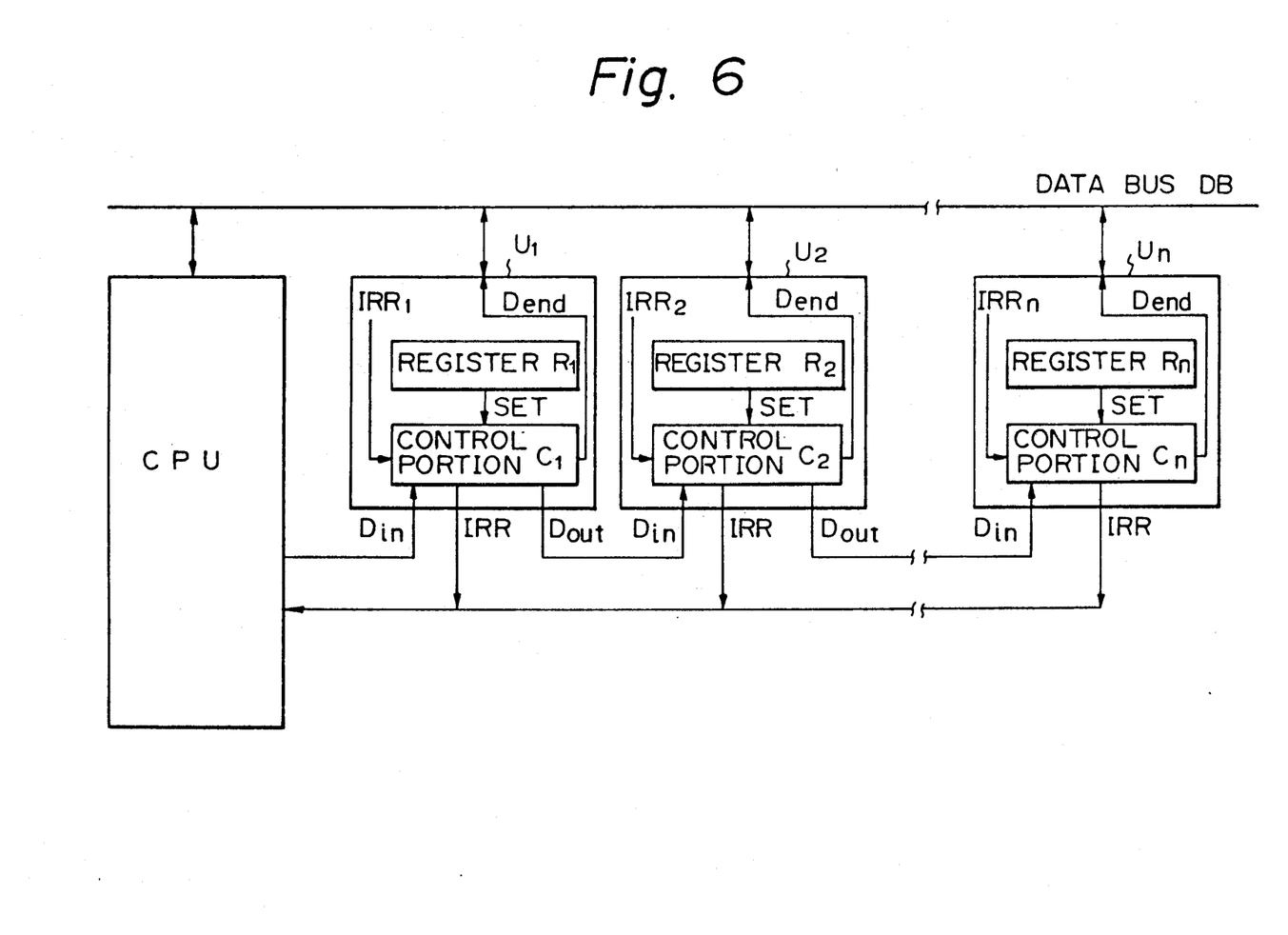
FIG. 6 is a block diagram illustrating another embodiment of an interrupt processing apparatus according to the present invention.

FIG. 6 is a block diagram illustrating another embodiment of an interrupt processing apparatus according to the present invention. This embodiment corresponds to the embodiment of FIG. 2, and the same portions and same signals shown in FIGS. 2 and 6 are indicated by the same reference numerals. The difference between these two embodiments is in the propagation of the end notice signal $D_{end}$. In the first embodiment of FIG. 2, the end notice signal $D_{end}$ from each peripheral unit is transferred to the central processing unit CPU through an exclusive signal conductor, and the central processing unit is returned from the response waiting state to a normal state. In the second embodiment of FIG. 6, however, an end notice signal $D_{end}$ is transferred through a data bus DB, for example, which end notice signal $D_{end}$ is a signal indicating a vector address of an error processing subroutine. When the central processing unit CPU receives the vector address signal $D_{end}$, the central processing unit CPU is returned from the response waiting state and the error processing subroutine corresponding to the vector address signal $D_{end}$ is carried out. In this embodiment, the exclusive signal conductor for transferring the end notice signal $D_{end}$ from each peripheral unit to the central processing unit CPU can be omitted.

Figures 7, 7A:
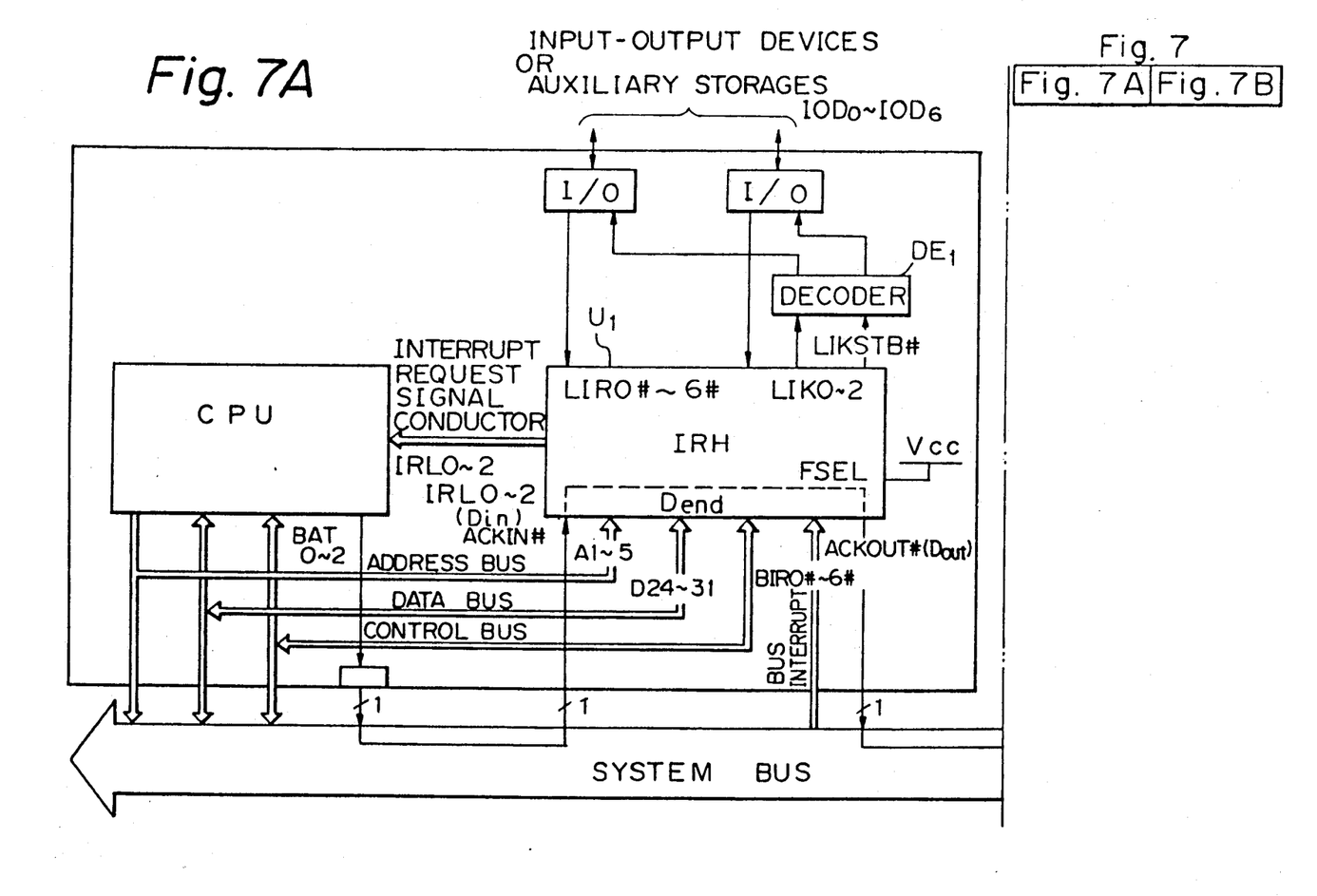
Figure 7B:
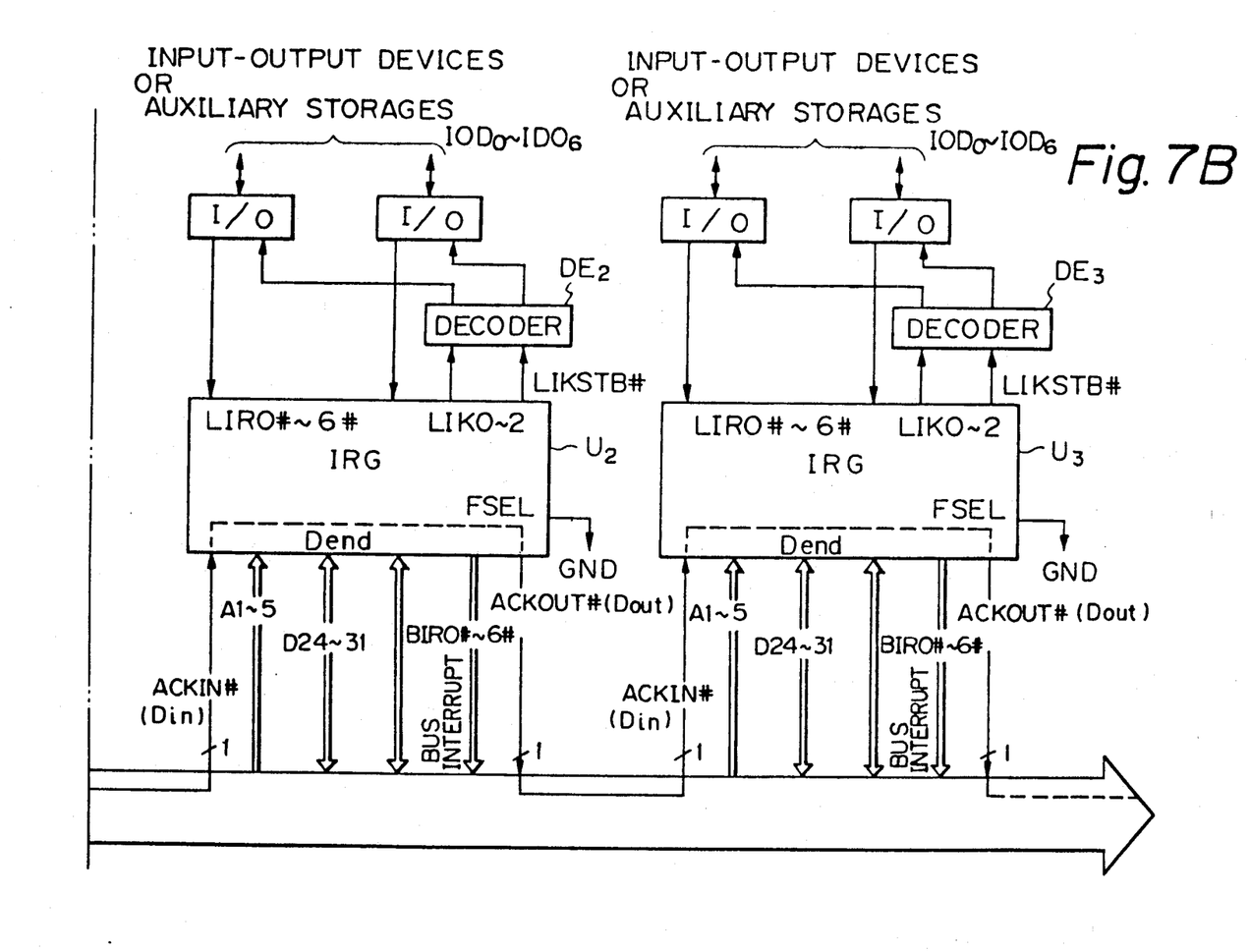

FIG. 7 is a block diagram of an interrupt processing apparatus using interrupt controllers. In the above described embodiments, each of the peripheral unit $U_1$-$U_n$ comprises an input-output device or an auxiliary storage device, for example, a cathode ray tube display, an optical mark reader, and a hard disk drive device, etc., but in the interrupt processing apparatus of FIG. 7, each of the peripheral unit $U_1$-$U_n$ comprises an interrupt controller. Note, in FIG. 7, only three peripheral units $U_1$-$U_3$ are indicated. The interrupt controller, which is used as an interrupt handler or an interrupt generator, controls a plurality of, for example, seven, input-output devices or auxiliary storages devices.

As shown in FIG. 7, the peripheral unit $U_1$ is used as an interrupt handler by applying a power supply potential to a function select terminal FSEL of an interrupt controller, and each peripheral unit $U_2$ and $U_3$ is used as an interrupt generator by applying a ground potential to a function select terminal FSEL of an interrupt controller. For example, seven input-output devices (or auxiliary storage devices) $IOD_0$-$IOD_6$ are connected to each interrupt handler or interrupt generator $U_1$-$U_3$ through I/O ports respectively. The seven input-output devices $IOD_0$-$IOD_6$ output a local interrupt request signal LIR0#-LIR6# to each peripheral unit $U_1$-$U_3$ of an interrupt handler or an interrupt generator, respectively. Each peripheral unit $U_1$-$U_3$ outputs local interrupt acknowledge signals LIK0-LIK2 and local interrupt acknowledge strobe signal LIKSTB# to each decoder $DE_1$-$DE_3$, and each decoder $DE_1$-$DE_3$ outputs an interrupt acknowledge signal to each input-output device $IOD_0$-$IOD_6$, respectively.

The peripheral unit of the interrupt handler $U_1$ is controlled by the central processing unit CPU through an address bus (A1 - 5), a data bus (D24 - 31), and a control bus. The peripheral unit $U_1$ is connected to the central processing unit CPU by interrupt request signal conductors IRL0-IRL2, and an interrupt request signal from the peripheral unit $U_1$ is transferred to the central processing unit CPU and an interrupt acknowledge signal ACKIN# from the central processing unit is transferred to the peripheral unit $U_1$, through the system bus. Similarly, the peripheral units of the interrupt generators $U_2$, $U_3$ are controlled by the central processing unit CPU by an address bus (A1 - 5), a data bus (D24 - 31), and a control bus, through a system bus. The peripheral units $U_2$, $U_3$ output bus interrupt signals BIR0# - BIR6# to the peripheral unit $U_1$ through the system bus, and an interrupt acknowledge signal ACKOUT# of the peripheral unit $U_1$ is transferred to the peripheral unit $U_2$ as an interrupt acknowledge signal ACKIN# and an interrupt acknowledge signal ACKOUT# of the peripheral unit $U_2$ is transferred to the peripheral unit $U_3$, respectively. In the above description, reference # indicates an inverted signal.

Figure 8:
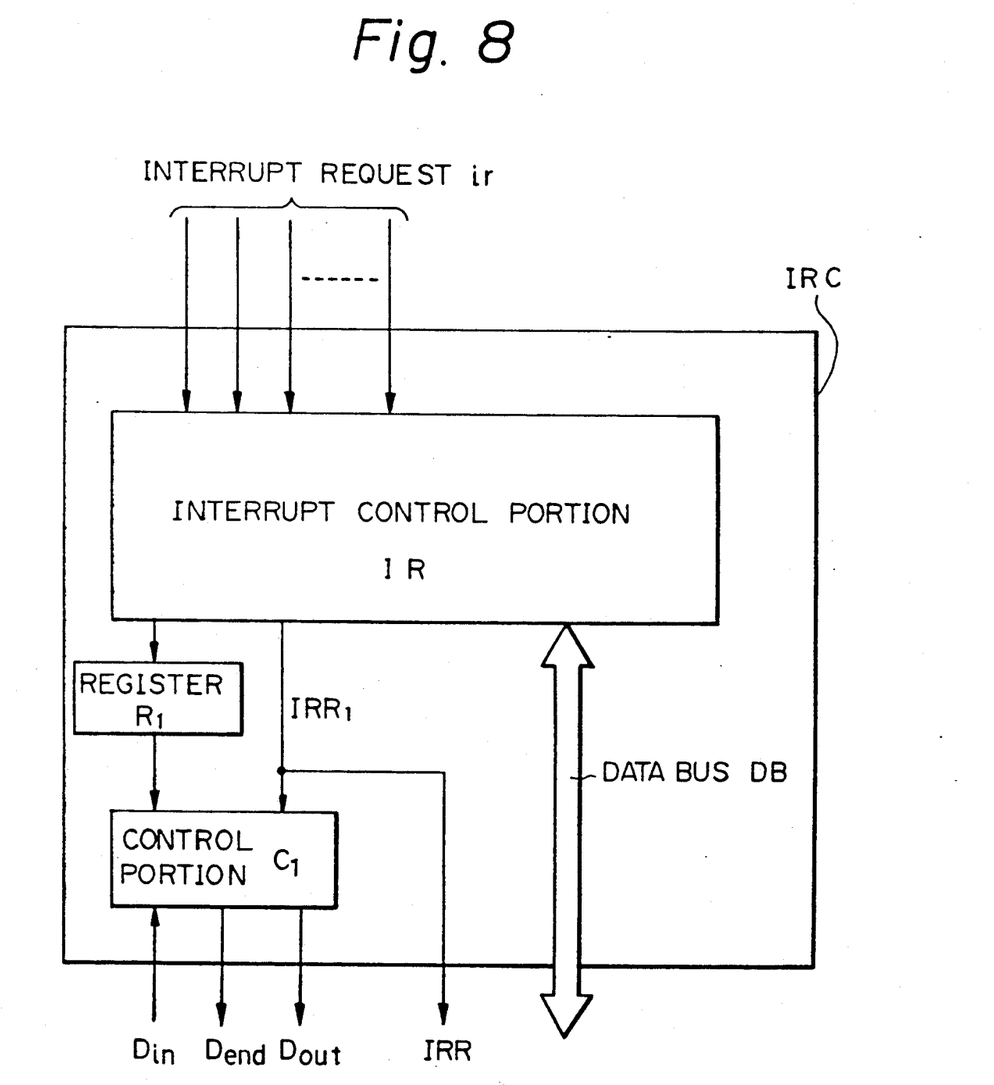
FIG. 8 is a block diagram illustrating an example of an interrupt controller applied to the interrupt processing apparatus shown in FIG. 2; and, FIG. 9 is a block diagram illustrating an example of an interrupt controller applied to the interrupt processing apparatus shown in FIG. 3.

FIG. 8 is a block diagram illustrating an example of an interrupt controller applied to the interrupt processing apparatus shown in FIG. 2. In FIG. 8, reference IR denotes an interrupt control portion and reference ir denotes an interrupt request from a plurality of peripheral units. Note the same portions as shown in FIGS. 2 and 8 are indicated by the same reference numerals.

An interrupt controller, which is used as an interrupt handler or an interrupt generator of the peripheral units $U_1$-$U_n$ in FIG. 2, comprises an interrupt control portion IR which groups the interrupt requests output from a plurality of, for example, seven input-output devices or auxiliary storage devices, on a priority basis, and controls a ranking of the interrupt requests. The interrupt control portion IR is connected to the central processing unit CPU through a data bus DB, and outputs a vector address corresponding to the peripheral unit outputting the interrupt request, when the interrupt control portion IR receives the interrupt acknowledge signal $D_{in}$. A setting operation for setting the end indicative information in the register $R_1$ is also carried out through the date bus DB and the interrupt control portion IR. A daisy chain connection is constructed by using interrupt controllers IRC as described in FIG. 7, and thus an optional portion of the daisy chain connection, by use of software, can be omitted.

Figure 9:
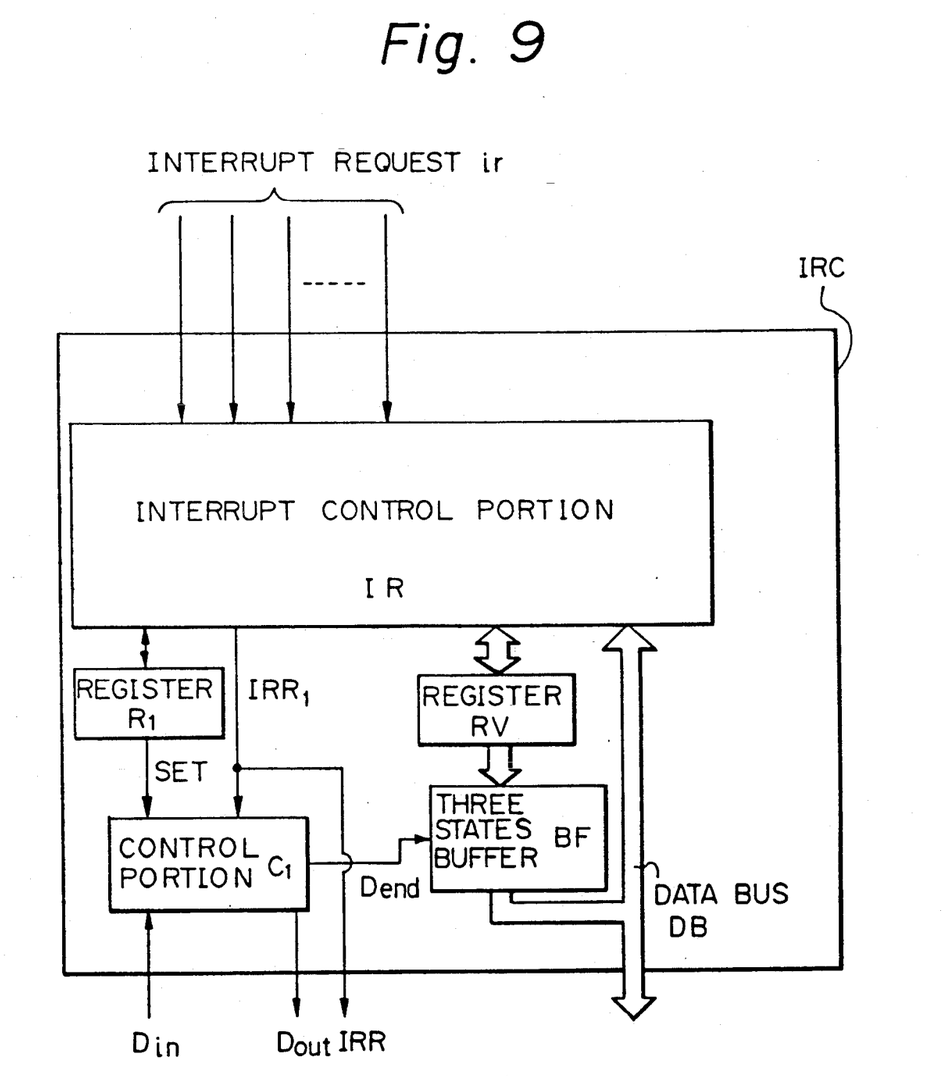

FIG. 9 is a block diagram illustrating an example of an interrupt controller applied to the interrupt processing apparatus shown in FIG. 3. In FIG. 9, reference IR denotes an interrupt control portion and reference ir denotes an interrupt request from a plurality of input-output devices or auxiliary storages. Note, the same portions as shown in FIGS. 3 and 9 are indicated by same references.

As described above in FIG. 8, the end notice signal $D_{end}$ is transferred to the central processing unit by a one-bit signal conductor, but as shown in FIG. 9, a vector address for starting an error processing subroutine can be transferred, instead of the end notice signal $D_{end}$, to the central processing unit CPU through the data bus DB. The difference of the configurations of the interrupt controllers of FIGS. 8 and 9 is that a register RV which sets a vector address for error processing and a three state buffer BF are provided, and the three states buffer is controlled by the end notice signal $D_{end}$. An operation of a control portion $C_1$ is the same as that of FIGS. 2 and 8.

The vector address for error processing is previously set through the data bus DB by the central processing unit CPU. When the end notice signal $D_{end}$ is "0", the three state buffer BF is disabled and an output of the three state buffer BF is brought to a high impedance state. When the end notice signal $D_{end}$ is "1", the three state buffer BF is enabled and the vector address stored in the register RV is output to the central processing unit CPU through the data bus DB.

As described above, in accordance with the present invention, when an error interrupt request is generated by noise, etc., a delay for the central processing unit CPU is reduced. Further, a daisy chain connection is cut at a selected portion and an interrupt request from an irrelevant peripheral unit can be ignored so that the efficiency of the processing is improved.

Many widely different embodiments of the present invention may be constructed without departing from the spirit and scope of the present invention, and it should be understood that the present invention is not limited to the specific embodiments described in this specification except as defined in the appended claims.

We claim:

1. A processing method for a computer system having a central processing unit and a plurality of peripheral units, wherein a request signal, comprising a request from at least one of said plurality of peripheral units, is transferred to said central processing unit, and an acknowledge signal in response to said request signal is successively propagated from said central processing unit to each of said plurality of peripheral units by a daisy chain connection, after which said central processing unit enters a response waiting state, which comprises the steps of:

using said central processing unit to set end indicative information in an end indicative information storing means of at least one of said plurality of peripheral units. aid end indicative information indicating an assigned final peripheral unit within said daisy chain connection;

outputting a specific signal notifying said central processing unit of a chain end state from said peripheral unit in which said end indicative information has been set in said end indicative information storing means thereof, said specific signal being output if said peripheral unit has not previously output a request signal and said peripheral unit receives said acknowledge signal;

providing means for returning said central processing unit from a response waiting state upon receiving said specific signal indicating a chain end state; and said central processing unit returning from the response waiting state when said central processing unit receives said specific signal from said peripheral unit in which said end indicative information has been set.

2. A processing method according to claim 1, wherein said request signal is an interrupt request signal, and said acknowledge signal is an interrupt acknowledge signal.

3. A processing method according to claim 1, wherein each of said peripheral units includes an end indicative information storage means, said end indicative information being set in one of said plurality of peripheral units by said central processing units, so that a propagation of said acknowledge signal is stopped at said one of said plurality of peripheral units and said specific signal is output from said one of said plurality of peripheral units.

4. A processing method according to claim 1, wherein said specific signal is an end notice signal, said end notice signal being transferred to said central processing unit by a one-bit signal conductor, so that said central processing unit is returned from said response waiting state to a normal state.

5. A processing method according to claim 1, wherein said specific signal is a vector address which indicates a start address of an error processing subroutine, said vector address being transferred to said central processing unit by a data bus, so that said central processing unit is returned from a response waiting state and carries out said error processing subroutine.

6. A processing method according to claim 1, wherein each of said plurality of peripheral units comprises an input-output device or an auxiliary storage.

7. A processing method according to claim 1, wherein each of said plurality of peripheral units comprises an interrupt controller which controls a plurality of input-output devices or auxiliary storages.

8. A processing method according to claim 1, wherein said end indicative information storing means comprises a one-bit register.

9. A processing apparatus having a central processing unit and a plurality of peripheral units, wherein a request signal, comprising a request from at least one of said plurality of peripheral units, is transferred to said central processing unit, and an acknowledge signal in response to said request signal is successively propagated from said central processing unit to each of said plurality of peripheral units by a daisy chain connection, wherein each of said plurality of peripheral units comprises request signal output means and input and output terminals, wherein at least one of said plurality of peripheral units comprises end indicative information storing means for storing end indicative information indicating a temporarily assigned final peripheral unit within said daisy chain connection and chain end state notification means for sending notification of said chain end state to said central processing unit, and wherein said central processing unit comprises means for receiving notification of said chain end state from said chain end state notification means; wherein:

said request signal output means are connected to said central processing unit for enabling a request signal from each of said plurality of peripheral units to be output to said central processing unit;

said input terminal and said output terminal are connected to said central processing unit or an adjacent peripheral unit to construct said daisy chain connection among said central processing unit and said plurality of peripheral units;

said end indicative information storing means is connected to said chain end state notification means for allowing communication therebetween;

said chain end state notification means is connected to said central processing unit for allowing notification of said central processing unit of a chain end state, said notification being sent if (a) said peripheral unit has not previously output a request signal, (b) said peripheral unit receives said acknowledge signal, and (c) said end indicative information is set in said end indicative information storing means thereof; and said means for receiving is connectable to said chain end state notification means and comprises means for returning said central processing unit from a response waiting state upon receiving a specific signal indicating a chain end state from said chain end state notification means.

10. A processing apparatus according to claim 9, wherein said request signal is an interrupt request signal, and said acknowledge signal is an interrupt acknowledge signal.

11. A processing apparatus according to claim 9, wherein each of said peripheral units includes an end indicative information storage means, said end indicative information being set in one of said plurality of peripheral units by said central processing unit, so that a propagation of said acknowledge signal is stopped at said one of said plurality of peripheral units and said specific signal is output from said one of said plurality of peripheral units, wherein said request signal is an interrupt request signal, and said acknowledge signal is an interrupt acknowledge signal.

12. A processing apparatus according to claim 9, wherein said chain end state notification means outputs an end notice signal, said end notice signal being transferred to said central processing unit by a one-bit signal conductor, so that said central processing unit is returned from said response waiting state to a normal state.

13. A processing apparatus according to claim 9, wherein said chain end state notification means output a vector address indicating a start address of an error processing subroutine, said vector address being transferred to said central processing unit by a data bus, so that said central processing unit is returned from a response waiting state and carries out said error processing subroutine.

14. A processing apparatus according to claim 9, wherein each of said plurality of peripheral units comprises an input-output device or an auxiliary storage.

15. A processing apparatus according to claim 9, wherein each of said plurality of peripheral units comprises an interrupt controller which controls a plurality of input-output devices or auxiliary storages.

16. A processing apparatus according to claim 9, wherein said end indicative information storing means comprises a one-bit register.

17. A processing apparatus according to claim 9, wherein said chain end state notification means comprises first and second inverter circuits and first and second three-input AND gate circuits:
an input terminal of said first inverter circuit being operatively connected to said request signal output means for receiving said request signal;
an input terminal of said second inverter circuit being operatively connected to said end indicative information storing means for receiving an end indicative signal from said end indicative information storing means;
a first input of said first AND gate circuit being operatively connected to an immediately prior peripheral unit or said central processing unit for receiving said acknowledge signal, a second input thereof being operatively connected to said first inverter circuit for receiving an inverted signal of said request signal, a third input thereof being operatively connected to said second inverter circuit for receiving an inverted signal of said end indicative signal, and an output thereof being operatively connected to an immediately peripheral unit for transferring said acknowledge signal;
a first input of said second AND gate circuits being operatively connected to said first input of said first AND gate circuits for receiving said acknowledge signal, a second input thereof being operatively connected to said second input of said first AND gate circuits for receiving an inverted signal of said request signal, a third input thereof being operatively connected to said end indicative information storing means for receiving said end indicative signal, and an output thereof being operatively connected to said central processing unit for transferring said specific signal in order to notify said central processing unit of a chain end state.

18. An interrupt controller comprising:
interrupt request signal output means, for being connectable to a central processing unit, and for outputting an interrupt request signal to said central processing unit;
an input terminal and an output terminal which are each connectable to the central processing unit or to a neighboring interrupt controller, for constructing a daisy chain connection;
end indicative information storing means for storing optional end indicative information of said daisy chain in accordance with an instruction output from said central processing unit;
chain end state notification means, connectable to said central processing unit and said end indicative information storing means, for notifying a chain end state to said central processing unit;
wherein, when (a) an interrupt acknowledge signal output from said central processing unit is propagated through said interrupt controller, (b) said end indicative information is set in said end indicative information storing means and (c) said interrupt request signal has not been output, said central processing unit is returned from a response waiting state upon receiving a chain end state notification from said chain end state notification means.

19. An interrupt controller according to claim 18, wherein said chain end stae notification means outputs an end notice signal, said end notice signal being transferred to said central processing unit by a one-bit signal conductor, so that said central processing unit is returned from said response waiting state to a normal state.

20. An interrupt controller according to claim 18, wherein said chain end stae notification means outputs a vector address indicating a start address of an error processing subroutine, said vector address being transferred to said central processing unit by a data bus, so that said central processing unit returns from a response waiting state and carries out said error processing subroutine.

21. An interrupt controller according to claim 18, wherein said end indicative information storing means comprises a one-bit register.

22. An interrupt controller according to claim 18, wherein said chain end stae notification means comprises first and second inverter circuits and first and second three-input AND gate circuits:
an input terminal of said first inverter circuit being operatively connected to said interrupt request signal output means for receiving said interrupt request signal;
an input terminal of said second inverter circuit being operatively connected to said end indicative information storing means for receiving an end indicative signal from said end indicative information storing means;
a first input of said first AND gate circuit being operatively connected to an immediately prior interrupt controller or said central processing unit for receiving said interrupt acknowledge signal, a second input thereof being operatively connected to said first inverter circuit for receiving an inverted signal of said interrupt request signal, a third input thereof being operatively connected to said second inverter circuit for receiving an inverted signal of said end indicative signal, and an output thereof being operatively connected to an immediately interrupt controller for transferring said interrupt acknowledge signal;

a first input of said second AND gate circuit being operatively connected to said first input of said first AND gate circuit for receiving said interrupt acknowledge signal, a second input thereof being operatively connected to said second input of said first AND gate circuit for receiving an inverted signal of said interrupt request signal, a third input thereof being operatively connected to said end indicative information storing means for receiving said end indicative signal, and an output thereof being operatively connected to said central processing unit for transferring said specific signal in order to notify said central processing unit of a chain end state.

23. A processing method for a computer system having a central processing unit and a plurality of peripheral units, wherein a request signal, comprising a request from at least one of said plurality of peripheral units, is transferred to said central processing unit, and an acknowledge signal in response to said request signal is successively propagated from said central processing unit to each of said plurality of peripheral units by a daisy chain connection, which comprises the steps of:

setting end indicative information in an end indicative information storing means of at least one of said plurality of peripheral units, said end indicative information indicating an assigned final peripheral unit within said daisy chain connection;

outputting a specific signal notifying said central processing unit of a chain end state from said peripheral unit in which said end indicative information has been set in said end indicative information storing means thereof, said specific signal being output if said peripheral unit has not previously output a request signal and said peripheral unit receives aid acknowledge signal; and returning said central processing unit from a response waiting state when said central processing unit receives said specific signal from said peripheral unit in which said end indicative information has been set;

wherein each of said peripheral units includes an end indicative information storage means, said end indicative information being set in one of said plurality of peripheral units by said central processing unit, so that a propagation of said acknowledge signal is stopped at said one of said plurality of peripheral units and said specific signal is output from said one of said plurality of peripheral units.

* * * * *